US000001012H

United States Statutory Invention Registration [19]

[11] Reg. Number: H1012

Senatro

[43] Published: Jan. 7, 1992

[54] TUBE CLAMP

[75] Inventor: Clement A. Senatro, Newington, Conn.

[73] Assignee: The United States of America as represented by the Secretary of the Air Force, Washington, D.C.

[21] Appl. No.: 607,434

[22] Filed: Oct. 26, 1990

[51] Int. Cl.[5] ..... F16L 3/22

[52] U.S. Cl. ..... 248/68.1

[58] Field of Search ..... 248/68.1, 74.4, 67.7, 248/316.6, 231.6

[56] References Cited

U.S. PATENT DOCUMENTS

| | | | |
|---|---|---|---|
| 539,462 | 5/1895 | Weiant | 248/74.4 |
| 827,573 | 7/1906 | Sheeley . | |
| 1,776,343 | 9/1930 | Allyn . | |
| 1,809,774 | 6/1931 | Coates | 248/74.4 X |
| 3,233,853 | 2/1966 | Majewski . | |
| 3,430,903 | 3/1969 | Mathes . | |
| 3,906,592 | 9/1975 | Sakasegawa et al. | 248/68.1 |
| 4,267,994 | 5/1981 | Lynch et al. | 248/65 |
| 4,595,163 | 6/1986 | Guggiari | 248/229 |
| 4,669,422 | 6/1987 | Steudler, Jr. | 248/68.1 X |

*Primary Examiner*—Michael J. Carone

*Attorney, Agent, or Firm*—Bobby D. Scearce; Donald J. Singer

[57] ABSTRACT

A tubing clamp is described which comprises first and second parts having respective first and second bases and first and second upstanding portions and sized for assembly with the second base resting upon the first base and the upstanding portions in confronting relationship, registering holes in the bases for receiving a bolt for threadably attaching the clamp to a supporting surface, a plurality of substantially semicylindrically shaped channels in each upstanding portion which in the assembly define a corresponding plurality of passageways for receiving and clamping tubing members, and a flange and inwardly sloping ramp on the first base for engaging an outer edge of the second base whereby torque applied to the bolt in the assembly is reacted by a force between the upstanding portions substantially uniformly clamping the tubing members.

3 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

TUBE CLAMP

RIGHTS OF THE GOVERNMENT

The invention described herein may be manufactured and used by or for the Government of the United States for all governmental purposes without the payment of any royalty.

BACKGROUND OF THE INVENTION

The invention relates generally to tube or cable clamps or brackets, and more particularly to a multiple tube clamp providing positive clamping force to all tubes in the clamp using a single bolt.

The invention provides a clamp for positioning and supporting a plurality of tubes stacked either vertically or horizontally with respect to a supporting surface and with substantially uniformly positive clamping force to each tube in the assembly. Alignment and assembly of clamp halves to each other and attachment of the clamp assembly to a supporting surface is provided by a single bolt.

It is therefore a principal object of the invention to provide an improved multiple tube clamp.

It is a further object of the invention to provide a multiple tube clamp providing positive clamping force to all tubes in the clamp using a single bolt.

These and other objects of the invention will become apparent as a detailed description of representative embodiments proceeds.

SUMMARY OF THE INVENTION

In accordance with the foregoing principles and objects of the invention, a tubing clamp is described which comprises first and second parts having respective first and second bases and first and second upstanding portions and sized for assembly with the second base resting upon the first base and the upstanding portions in confronting relationship, registering holes in the bases for receiving a bolt for threadably attaching the clamp to a supporting surface, a plurality of substantially semicylindrically shaped channels in each upstanding portion which in the assembly define a corresponding plurality of passageways for receiving and clamping tubing members, and a flange and inwardly sloping ramp on the first base for engaging an outer edge of the second base whereby torque applied to the bolt in the assembly is reacted by a force between the upstanding portions substantially uniformly clamping the tubing members.

DESCRIPTION OF THE DRAWINGS

The invention will be more clearly understood from the following detailed description of representative embodiments thereof read in conjunction with the accompanying drawings wherein.

DETAILED DESCRIPTION

Figure 1:
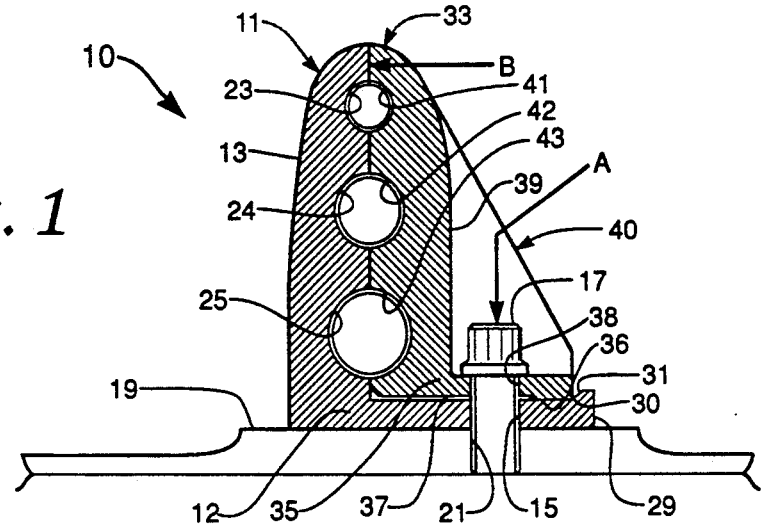
FIG. 1 is a view in elevation of one embodiment of the invention for clamping tubes of different diameters.
Figure 2:
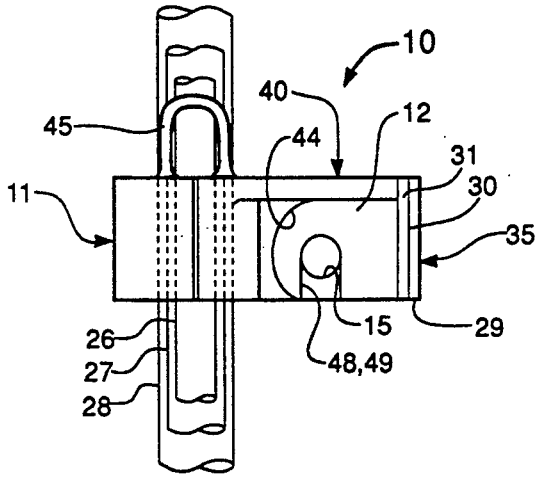
FIG. 2 is a plan view of the FIG. 1 clamp.
Figure 3:
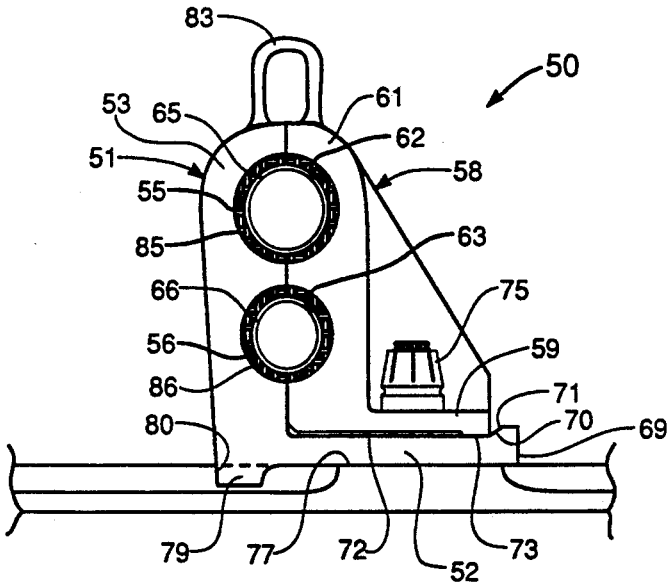
FIG. 3 is an elevational view of a second embodiment of the invention for clamping tubes of different diameters.

Referring now to the drawings, FIG. 1 is an elevational view of one embodiment of the invention for clamping three tubes. FIG. 2 is a top view of the FIG. 1 clamp. It is noted at the outset that a clamp configured according to these teachings may receive one or more tubes of the same diameter or of different diameters stacked in any preselected order. In the FIG. 1 embodiment, three tubes of different diameters are stacked vertically with successively larger tube diameter top to bottom. FIG. 3 shows a second embodiment for clamping tubes of different diameters stacked with successively smaller tube size top to bottom. The number of tubes received, respective tube diameters and order of stacking are therefore not limiting of the invention. In accordance with a governing principle of the invention, a single clamping bolt provides uniform positive clamping force to all the tubes and secures the clamp to a support surface.

In FIGS. 1 and 2, representative clamp 10 assembly comprises first part 11 including base 12 and upstanding portion 13. Base 12 has hole 15 therein sized for receiving bolt 17 and is otherwise configured for attachment to a supporting surface 19 having a threaded hole 21 for threadably receiving bolt 17. Upstanding portion 13 has one or more (three in FIG. 1) generally semicylindrical channels 23,24,25 sized to receive a corresponding number and size of tubing members 26,27,28. Base 12 has flange 29 along the width thereof defining an inwardly sloping ramp 30 at preselected angle 31. Second part 33 has base portion 35 including raised surface portion 36 on bottom surface 37 thereof for contacting the upper surface of base 12 within flange 29, and includes hole 38 for passing bolt 17 in the assembled condition. Upstanding portion 39 may include web 40 for providing structural strength to part 33 and for facilitating alignment of parts 11,33 as bolt 17 is torqued in the assembly of clamp 10. Portion 39 has the number of semicylindrical channels 41,42,43 of size and spacing corresponding to channels 23,24,25 in portion 13 defined along the height of second part 33 for registration with channels 23,24,25 in the assembled condition.

Ramp 30 is included on one end of base 12 in part to accommodate misalignment of parts 11,33 and to allow a desirable hole 38 clearance. In assembling clamp 10 in clamping tubing members 26, 27,28, bolt 17 is tightened to assemble parts 11,33 and to secure assembled clamp 10 to surface 19. As bolt 17 is tightened in the assembly of parts 11,33, raised portion 36 on base portion 35 slides downwardly in contact with ramp 30 to set parts 11,33 in position. Tightening bolt 17 as by downwardly directed force A generates a couple about raised portion 36 contacting ramp 30 which is reacted by force B distributed along confronting upstanding portions 13,39, which provides the desired substantially uniform positive clamping force to each tubing member 26,27,28. A generally circular shaped recess 44 (see FIG. 2) may be defined in base portion 35 for snugly receiving the appropriately sized socket wrench (not shown) to facilitate alignment of parts 11,33 in assembly of clamp 10.

There may be a requirement for parts 11,33 to remain loosely assembled in order to avoid separation and/or loss of one of the parts. Accordingly, lanyard 45 may be attached by any suitable means at corresponding ends thereof to parts 11,33 as suggested in FIG. 2. Further, in order to accommodate a requirement that one or both parts 11,33 be removable from the assembly without completely removing bolt 17 from surface 19, slots 48,49 may be provided in respective sides of bases 12,35 so that parts 11,33 may be slipped under bolt 17 partially threaded into hole 21.

Referring now to FIG. 3, shown therein is an elevational view of a second embodiment of the invention. Clamp 50 includes first part 51 having base 52 and upstanding portion 53 with semicylindrical channels 55,56, and second part 58 having base portion 59 and upstanding portion 61 with semicylindrical channels 62,63, for clamping tubes 65,66. Base 52 includes flange 69 defining ramp 70 disposed at angle 71, and base portion 59 includes on bottom surface 72 a raised surface portion 73 all with functions substantially identical to similarly named elements of clamp 10 of FIGS. 1,2. Bolt 75 secures clamp 50 to a threaded hole in supporting surface 77. Clamp 50 may further include lug 79 on base 52 to be received by a correspondingly sized slot 80 in surface 77 for preventing first part 51 from turning under torque applied to bolt 75 in securing clamp 50 to surface 77. It is noted that lug 79 may be replaced by a lip or flange (not shown) on the edge of base 52 for being received by a slot in surface 77 or for engaging an edge of the member defining surface 77. Lanyard 83 serves the same function as lanyard 45 of clamp 10.

As suggested in the FIG. 3 embodiment, appropriately sized resilient annular spacers 85,86 may be disposed within channels 55,56,62,63 around tubes 65,66 for cushioning, vibration absorption, or other similar function.

Figure 4:
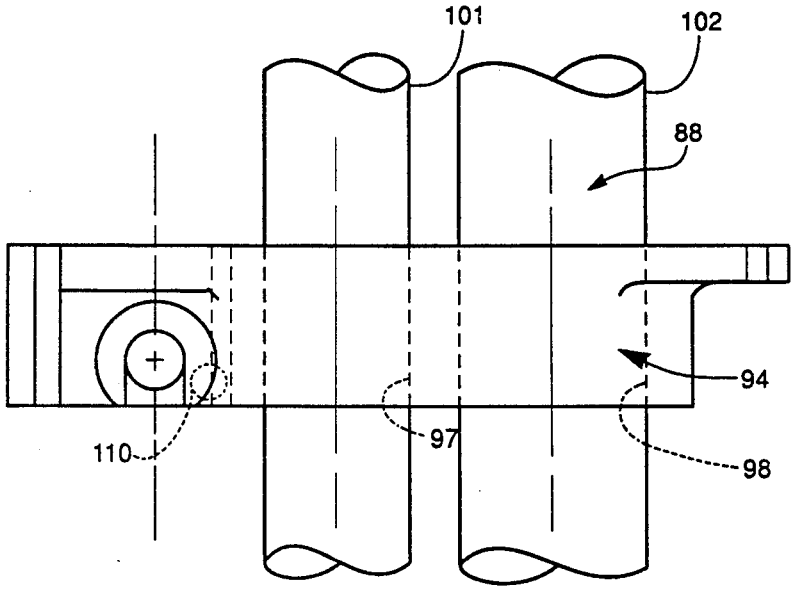
FIG. 4 is a plan view of another embodiment of the invention for clamping tubes horizontally with respect to a supporting surface.
Figure 5:
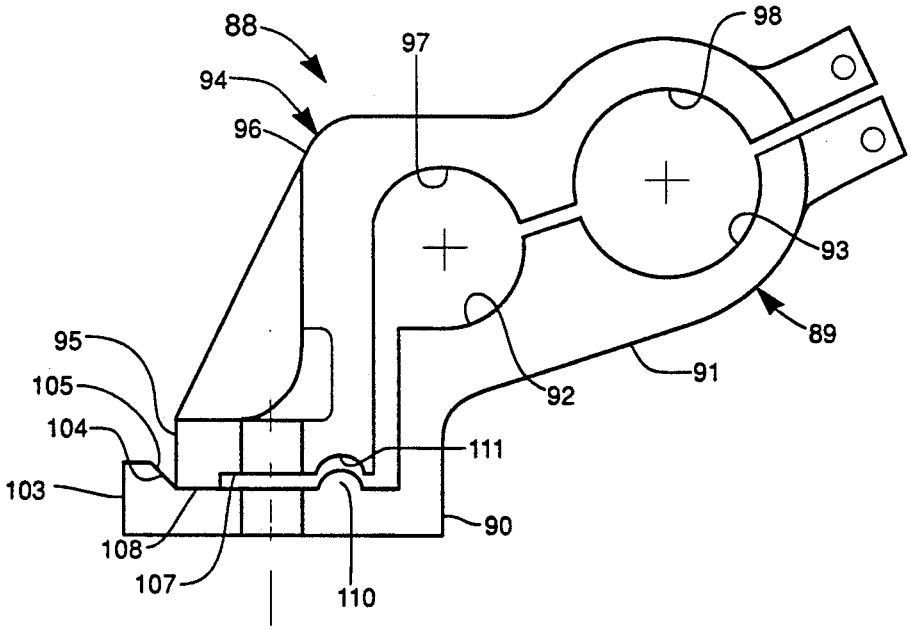
FIG. 5 is an elevational view of the FIG. 4 clamp.

Referring now to FIGS. 4 and 5, shown therein are plan and elevational views of another embodiment of the invention for horizontal stacking of tubes with respect to a supporting surface. Clamp 88 may therefore include first part 89 having base 90 and upstanding portion 91 with semicylindrical channels 92,93, and second part 94 having base portion 95 and upstanding portion 96 with semicylindrical channels 97,98 for clamping tubes 101, 102. Base 90 includes flange 103 defining ramp 104 disposed at angle 105, and base portion 95 includes on bottom surface 107 a raised surface portion 108 all with functions substantially identical to similarly named elements of clamps 10,50 of FIGS. 1,2,3. The invention as embodied in clamp 88 illustrate that moments effecting substantially uniform clamping can be achieved in a configuration retaining the tubes essentially horizontally.

Clamp 88 illustrates an additional feature includable in any embodiment of the invention for ensuring proper alignment of the clamp parts (e.g. 89,94 of FIG. 5) in torquing the bolt in the assembly of the clamp. A detent reature including mating dimple 110 and depression 111 may be included to ensure proper matching of the clamp parts.

The component parts of the clamp of the invention in any embodiment described or suggested herein may comprise any suitable material depending on the temperature environment to which the clamp is subjected in use. Accordingly, cast or machined aluminum or other metal or alloy or plastic (injection molded or otherwise) may be selected as would occur to the skilled artisan, material selection not considered limiting of the invention.

The invention therefore provides a clamp assembly providing positive clamping force to each of a plurality of tubes of different diameters utilizing a single bolt to assemble the clamp and to secure the clamp to a supporting surface. It is understood that modifications to the invention may be made as might occur to one skilled in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

I claim:

1. A tubing clamp comprising:

(a) a first part including a first base portion and a first upstanding portion;

(b) a second part including a second base portion and a second upstanding portion, said second portion sized and configured to assemble to said first portion with said second base resting upon said first base and said second upstanding portion confronting said first upstanding portion in an assembled condition of said first and second parts;

(c) a bolt for threadably attaching said clamp to a supporting surface having a corresponding threaded hole therein;

(d) said first base and said second base having registering holes therethrough for receiving said bolt;

(e) means defining a plurality of substantially semicylindrically shaped first channels in said first upstanding portion and means defining a corresponding plurality of correspondingly sized substantially semicylindrically shaped second channels in said second upstanding portion, said first channels registering with corresponding second channels in said assembled condition to define said plurality of passageways for receiving a corresponding plurality of tubing members;

(f) a flange on said first base for selectively positioning said second base thereon, said flange including an inwardly sloping ramp for engaging an outer edge of said second base whereby torque applied to said bolt in said assembled condition is reacted by a force between said second upstanding portion and said first upstanding portion to substantially uniformly hold said tubing members within said clamp.

2. The clamp of claim 1 further comprising first and second registering slots in respective said first and second bases extending from corresponding edges of said first and second bases to said holes therein.

3. The clamp of claim 1 further comprising an annularly shaped resilient spacer within each said passageway of said assembled condition to cushion said tubing members held therein.

* * * * *